United States Patent [19]
Kanbe et al.

[11] Patent Number: 5,775,174
[45] Date of Patent: Jul. 7, 1998

[54] VEHICULAR FOOT-OPERATED PARKING BRAKE CONTROL APPARATUS

[75] Inventors: Kazunari Kanbe, Kariya; Takashi Ishikawa, Hekinan; Takuya Inaba, Chiryu; Masayoshi Katagiri, Toyota, all of Japan

[73] Assignee: Aisin Seiki Kabushiki Kaisha, Kariya, Japan

[21] Appl. No.: 684,234

[22] Filed: Jul. 19, 1996

[30] Foreign Application Priority Data

Jul. 20, 1995 [JP] Japan .................................. 7-183729

[51] Int. Cl.$^6$ .................................................. G05G 5/06
[52] U.S. Cl. .......................................... 74/542; 74/535
[58] Field of Search .......................... 74/512, 540, 542, 74/535

[56] References Cited

U.S. PATENT DOCUMENTS

| | | |
|---|---|---|
| 4,597,307 | 7/1986 | Kawaguchi et al. . |
| 4,872,368 | 10/1989 | Porter . |
| 5,588,335 | 12/1996 | Strait .................. 74/542 X |

FOREIGN PATENT DOCUMENTS

| | | |
|---|---|---|
| 0 527 518 | 2/1993 | European Pat. Off. . |
| 58-105860 | 6/1983 | Japan . |
| 64-18755 | 1/1989 | Japan . |

*Primary Examiner*—Rodney H. Bonck
*Assistant Examiner*—Saúl Rodríguez
*Attorney, Agent, or Firm*—Burns, Doane, Swecker & Mathis, LLP

[57] ABSTRACT

A vehicular foot-operated parking brake control apparatus is designed to achieve reliable and easy operation of the apparatus while also reducing the apparatus size and the stroke loss. The apparatus includes a mounting bracket that is adapted to be fixed to a vehicle body, and a pedal that is rotatably mounted on the bracket for rotation about a rotational axis, with the pedal being connected to a parking brake control cable. The pedal is provided with a plurality of ratchet teeth and a pawl is rotatably mounted on the bracket for rotation between a first rotational position in which the pawl is engaged with the ratchet teeth and a second rotational position in which the pawl is disengaged from the ratchet teeth. The pawl is slidably mounted on the bracket to slide between a first slide position and a second slide position. The apparatus is designed to allow the parking brake to be engaged and disengaged by pressing on the pedal.

15 Claims, 7 Drawing Sheets

VEHICULAR FOOT-OPERATED PARKING BRAKE CONTROL APPARATUS

FIELD OF THE INVENTION

The present invention generally relates to a foot-operated parking brake control apparatus for vehicles such as motor vehicles. More particularly, the present invention pertains to a vehicular foot-operated parking brake control apparatus that permits the parking brake to be released by performing the same operation as that performed to effect activation of the parking brake.

BACKGROUND OF THE INVENTION

In typical vehicular foot-operated parking brake control apparatus, the parking brake is engaged or activated by pressing on the parking brake lever with a foot. The parking brake is then released or deactivated through hand operation of a release lever. This conventional type of control apparatus requires an additional mechanism for releasing the brake by hand, thereby increasing both the number of component parts and the costs associated with manufacturing the device. Furthermore, shorter drivers must lean their upper body forward to perform the parking brake releasing operation.

There exists a parking brake control apparatus that is designed to provide foot operated releasing action for the parking brake to facilitate the deactivation or releasing operation. For example, Japanese Patent Application Laid-Open No. Sho 58-105860 describes a parking brake construction in which a main pedal is provided to actuate the parking brake and an auxiliary pedal is connected to the main pedal. The auxiliary pedal is designed to be depressed to effect the release of the main pedal and the parking brake. Although this construction eliminates the need for a driver to lean to release the parking brake, this construction requires that the driver properly operate the two pedals. Further, this construction increases the number of component parts and raises the overall cost associated with constructing the parking brake mechanism.

Japanese Patent Application Laid-Open No. Sho 64-18755 discloses in FIGS. 9–13 of its drawings a construction in which the parking brake is actuated by depressing a pedal, and is released by depressing the pedal again in substantially the same manner as the pedal is depressed to actuate or activate the parking brake. In this construction, a pawl that engages ratchet teeth provided on the pedal to lock the pedal is slidable over a predetermined distance in the pivotal direction of the pedal, and a spring that is connected at one end to the pawl and at the other end to the bracket urges the pawl selectively in two directions, one direction to engage the pawl with the ratchet teeth and the opposite direction.

When the parking brake is released, the spring urges the pawl in the direction which effects engagement of the pawl with the ratchet teeth. By depressing the pedal, the pawl engages the ratchet teeth to inhibit the pedal from returning and the parking brake will then be held in an actuated state. When the depressing force on the pedal is removed, the pawl is slid a predetermined distance in the pedal returning direction so that the spring urges the pawl in the opposite direction, i.e., the direction for releasing the pawl from the ratchet teeth. When the pedal is depressed again, the pressing contact between the pawl and the ratchet teeth is removed so that the pawl is released from the ratchet teeth to allow the pedal to return. The parking brake is thus released.

The above-described parking brake control apparatus described in Japanese Patent Application Laid-open No. Sho 64-18755 is intended to be relatively easy to operate. However, the switching of the directions in which the spring urges the pawl depends upon the displacement of the pawl end of the spring, the distance between the pivotal center of the pedal to the pivotal center of the pawl, and the travel distance of the pawl in the pivotal direction of the pedal. Thus, a sufficiently long travel distance of the pawl in the pedal pivotal direction must be provided to perform the switching of the pawl without failure and to minimize the size of the apparatus. Thus, the apparatus suffers from a long stroke loss. That is, the travel distance of the pawl in the pedal pivotal direction causes a pivotal movement of the pedal in the return direction (stroke loss) when the depressing force applied to the pedal is removed, the length of the pivotal movement is proportional to the length of the travel distance, and the affect of the parking brake is reduced according to the pivotal movement of the pedal.

SUMMARY OF THE INVENTION

Accordingly, a need exists for a foot-operated parking brake control apparatus that enables the parking brake to be activated or set by depressing the parking brake pedal and to be released by depressing the parking brake pedal again in generally the same manner as it is depressed to effect activation of the parking brake. A need also exist for a foot-operated parking brake control apparatus that achieves reliable operation and reduces the apparatus size and the stroke loss.

According to one aspect of the present invention, a vehicular foot-operated parking brake control apparatus includes a mounting bracket adapted to be fixed to a vehicle body, and a pedal rotatably mounted on the bracket and connected to a parking brake control cable. The pedal is provided with a plurality of ratchet teeth and a pawl is rotatably mounted on the bracket to turn between a first rotational position in which the pawl is engaged with the ratchet teeth and a second rotational position in which the pawl is released from the ratchet teeth. The pawl is also slidably mounted on the bracket to slide between a first slide position and a second slide position. A release lever is rotatably mounted on the bracket to turn between a release rotational position and a non-release rotational position, and a spring is connected at one end to the pawl and at the opposite end to the release lever. The spring constantly urges the pawl to slide towards the first slide position, and the spring urges the release lever to stay in the non-release rotational position and urges the pawl to turn towards the first rotational position when the release lever is in the non-release position. The spring also urges the release lever to stay in the release rotational position and urges the pawl to turn towards the second rotational position when the release lever is in the release rotational position. A first cooperating arrangement is provided between the pawl and the release lever for turning the release lever from the non-release rotational position to the release rotational position when the pawl is moved from the first slide position to the second slide position, and a second cooperating arrangement is provided between the release lever and the pedal for turning the release lever from the release rotational position to the non-release rotational position when the pedal is turned from a parking brake engaging position to a parking brake releasing position.

By depressing the pedal of the foot-operated parking brake control when the parking brake has been released, the pawl is engaged with the ratchet teeth and inhibits the pedal from returning. The engagement of the parking brake is thus effected. When the depressing force on the pedal is removed, the pawl slides a predetermined distance in the returning direction of the pedal so that the spring urges the pawl in the direction to release the pawl from the ratchet teeth. When the pedal is depressed again, the pressing contact between the pawl and the ratchet teeth is removed so that the pawl is released from the ratchet teeth to allow the pedal to return, thus releasing the parking brake.

More specifically, when the depression force applied to the pedal to effect activation of the parking brake is removed, the pawl slides from the first slide position to the second slide position. This sliding of the pawl turns the release lever from the non-release rotational position to the release rotational position. The rotation of the release lever shifts the second end of the spring so that the spring, which has been urging the pawl to turn towards the first rotational position, now urges the pawl to turn towards the second rotational position. Since the displacement of the second end of the spring relative to the sliding distance of the pawl can be increased as desired by suitably setting the lever ratio (i.e., the ratio of the distance between the pivotal center of the release lever and the second end of the spring to the distance between the pivotal center of the release lever and the input point of the pawl), the displacement of the second end of the spring can be increased without increasing the distance between the pivotal center of the pedal and the pivotal center of the pawl and without increasing the sliding distance of the pawl. Thus, the construction of the apparatus ensures reliable operation, achieves a reduction in the size of the apparatus, and reduces stroke loss.

Preferably, the mass of the pawl is distributed about the rotational axis of the pawl so that the gravitational force on the pawl is less than the force from the spring but sufficiently great to turn the pawl from the first rotational position to the second rotational position in the event the spring is broken or otherwise rendered inoperable.

According to another aspect of the present invention, a vehicular foot-operated parking brake control apparatus includes a mounting bracket for being fixed to a vehicle body, a pedal rotatably mounted on the bracket for rotation about a rotational axis to alternatively effect a parking brake engaged condition and a parking brake disengaged condition through application of a depression force to the pedal. The pedal is provided with a plurality of ratchet teeth along an arc disposed about the rotational axis of the pedal. A pawl is rotatably mounted on the bracket for being rotated in a first rotation direction in which the pawl is urged towards engagement with the ratchet teeth and a second rotational direction opposite the first rotational direction in which the pawl is urged away from engagement with the ratchet teeth. The pawl is also slidably mounted on the bracket to slide between a first slide position and a second slide position. A spring is connected to the pawl and is movable between a first orientation in which the spring imparts a force to the pawl that urges the pawl to slide towards the first slide position and that urges the pawl in the first rotational direction and a second orientation in which the spring imparts a force to the pawl that urges the pawl to slide towards the first slide position and that urges the pawl in the second rotational direction. An arrangement is also provided for causing the spring to move from the first orientation to the second orientation upon release of the depression force applied to the pedal in the parking brake engaged condition.

BRIEF DESCRIPTION OF THE DRAWING FIGURES

The foregoing and additional features of the present invention will become more apparent from the following description of a preferred embodiment considered in conjunction with the accompanying drawing figures in which like elements are designated by like reference numerals and wherein.

DETAILED DESCRIPTION OF PREFERRED EMBODIMENT

Figure 1:
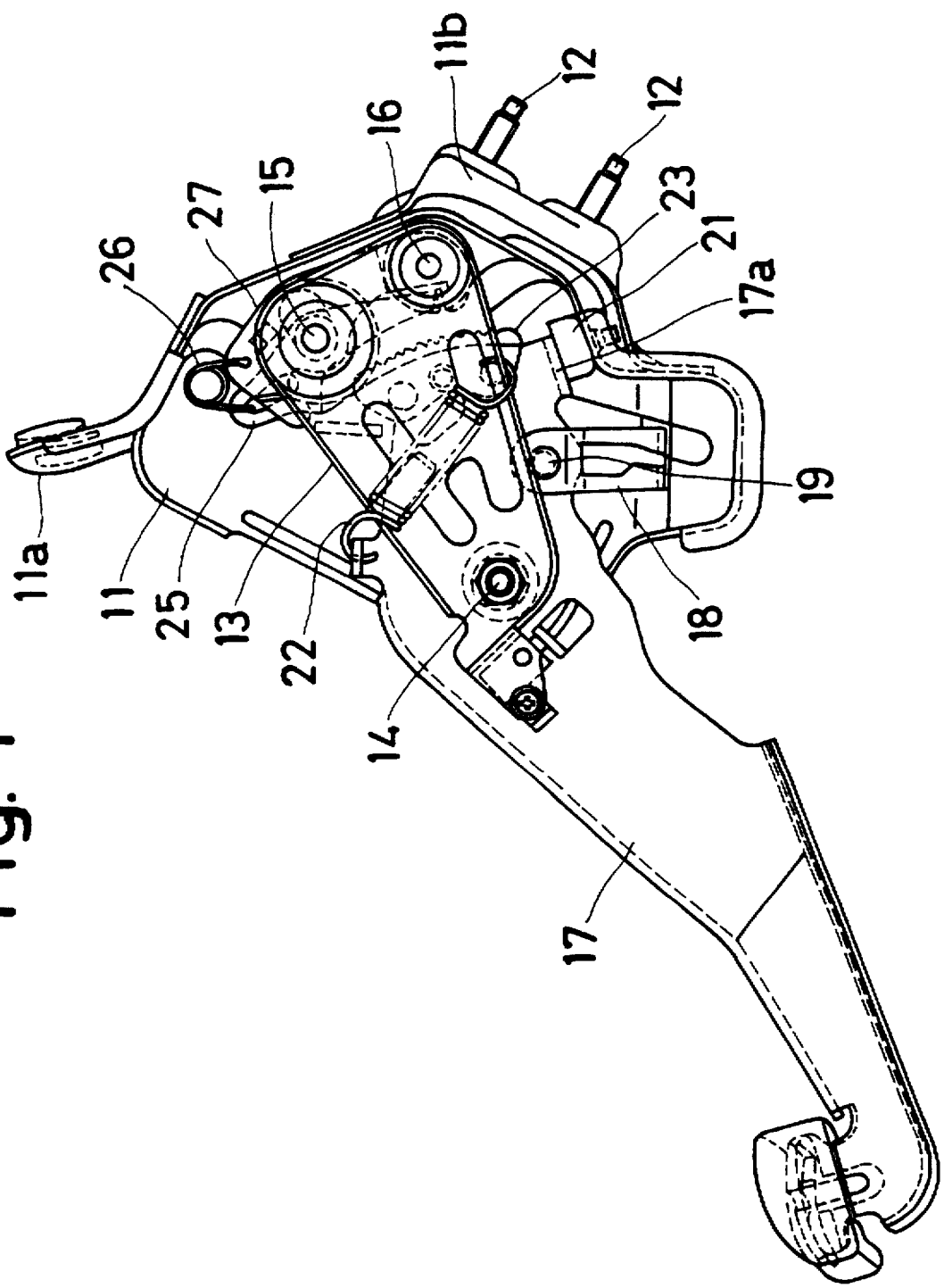
FIG. 1 is a side view of an embodiment of the foot-operated parking brake control apparatus of the present invention.
Figure 2:
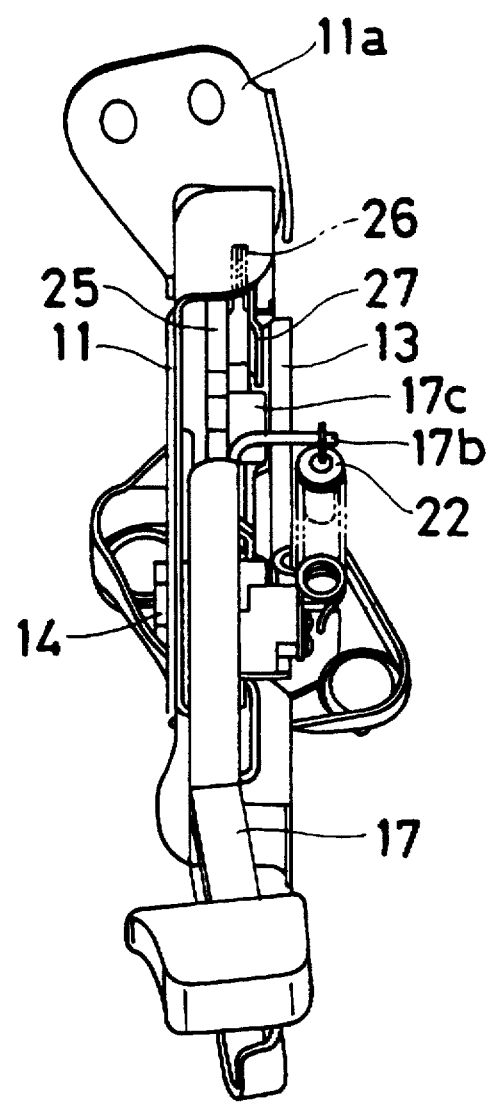
FIG. 2 is a left end view of the parking brake shown in FIG. 1.
Figure 3:
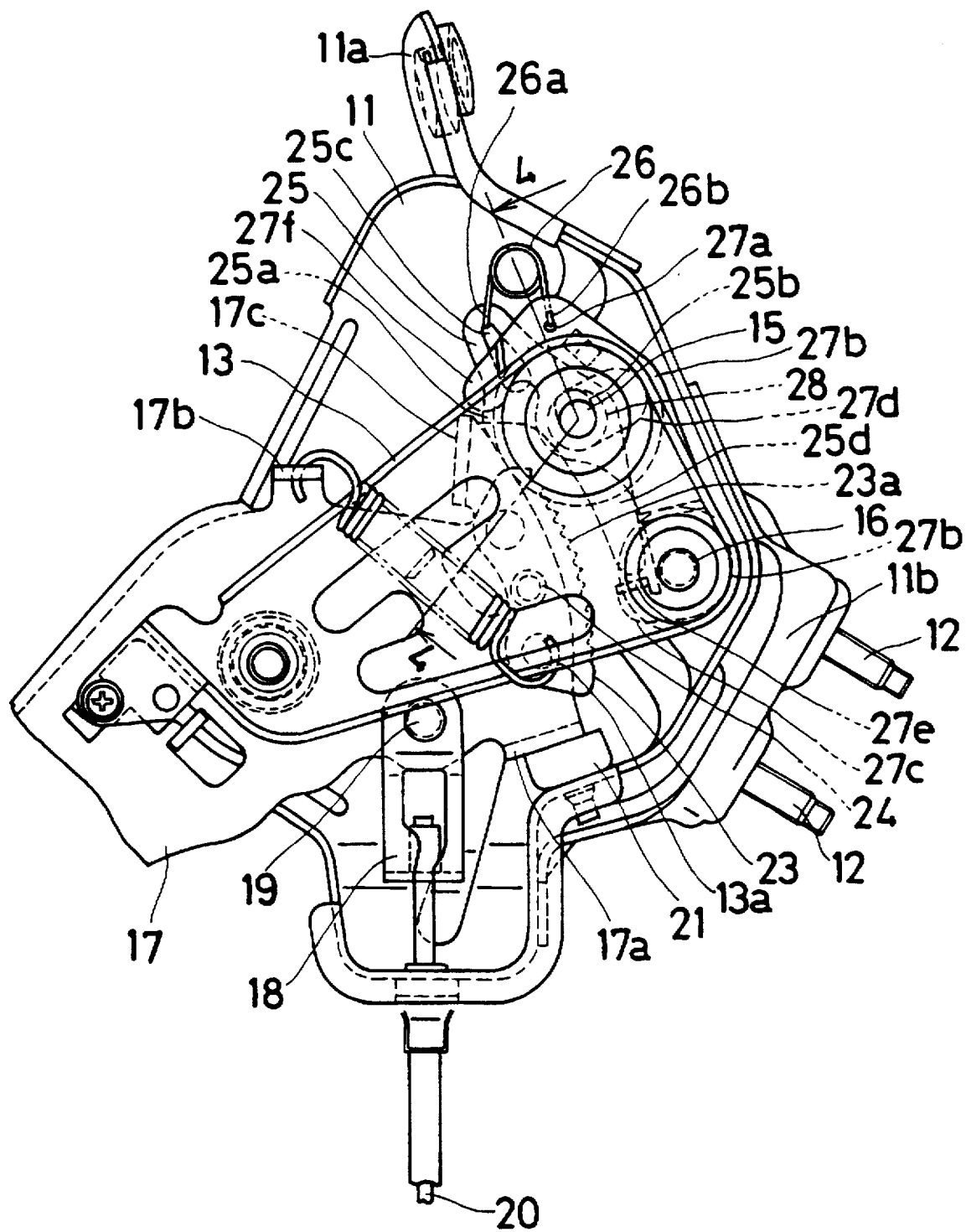
FIG. 3 is an enlarged side view of a portion of the parking brake shown in FIG. 1.
Figure 4:
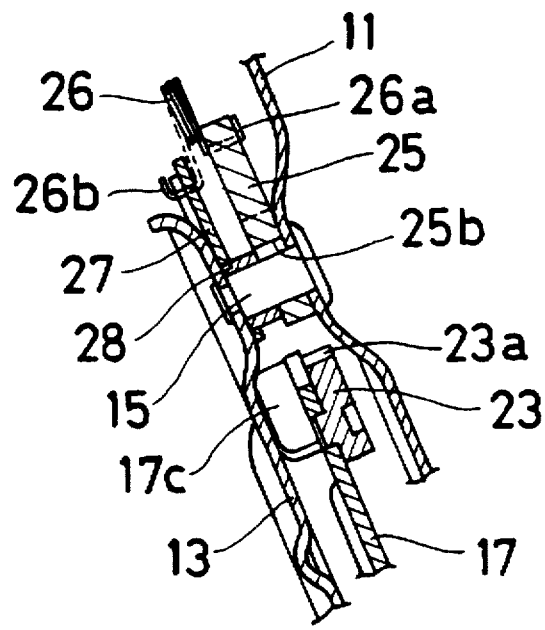
FIG. 4 is a cross-sectional view of the parking brake taken along the section line 4—4 in FIG. 3.

Referring to FIGS. 1 to 3, a foot-operated parking brake control apparatus according to the present invention includes a main bracket 11 that is adapted to be anchored to a vehicle body (not specifically shown). The main bracket 11 is provided with a mounting portion 11a at the upper end of the main bracket 11 and a mounting portion 11b to which mounting bolts 12,12 are fixed. An auxiliary bracket 13 (shown in front of the main bracket 11 in FIG. 1 and to the right of the main bracket 11 in FIG. 2) is connected to the main bracket 11 by a bolt and nut 14 and connection pins 15, 16 so that the auxiliary bracket 13 is generally parallel to the main bracket 11. The bolt and nut 14 rotatably support a pedal 17 disposed between the main bracket 11 and the auxiliary bracket 13. The rotational axis of the pedal 17 is disposed in a generally horizontal manner.

A clevis 18 is rotatably journaled to the pedal 17 by a pin 19 and one end of a parking brake control cable 20 is connected to the clevis 18. The other end of the parking brake control cable 20 is drivingly connected to a wheel brake mechanism (not specifically shown). When the pedal 17 is pivoted about the axis of the bolt and nut 14 in the counterclockwise direction with reference to the illustrations in FIGS. 1 and 3, the wheel brake mechanism is operated to effect activation or setting of the parking brake.

The rotation of the pedal 17 in the clockwise direction in FIGS. 1 and 3 is restricted by an abutting portion 17a of the pedal 17 that abuts a stopper 21. The stopper 21 is formed of a rubber mass and is fixed to the main bracket 11. The position of the pedal 17 shown in FIGS. 1 and 3 is the position assumed by the parking brake pedal 17 when the parking brake is released. The pedal 17 is urged to turn about the bolt and nut 14 in the clockwise direction with reference to the illustration in FIGS. 1 and 3 by a return spring 22 that extends between a spring connecting portion 17b of the pedal 17 and a spring connecting portion 13a of the auxiliary bracket 13.

Figure 5:
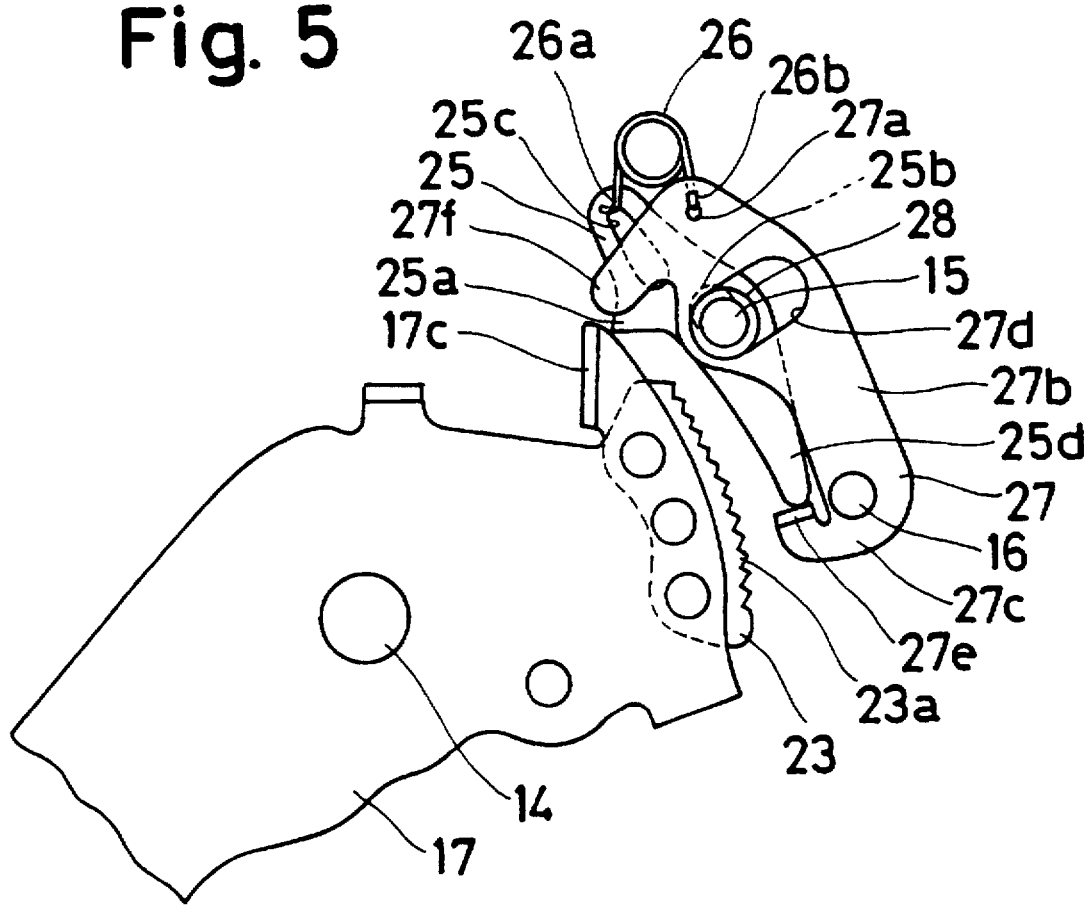
FIG. 5 is a side view of a portion of the parking brake with the parking brake released.
Figure 6:
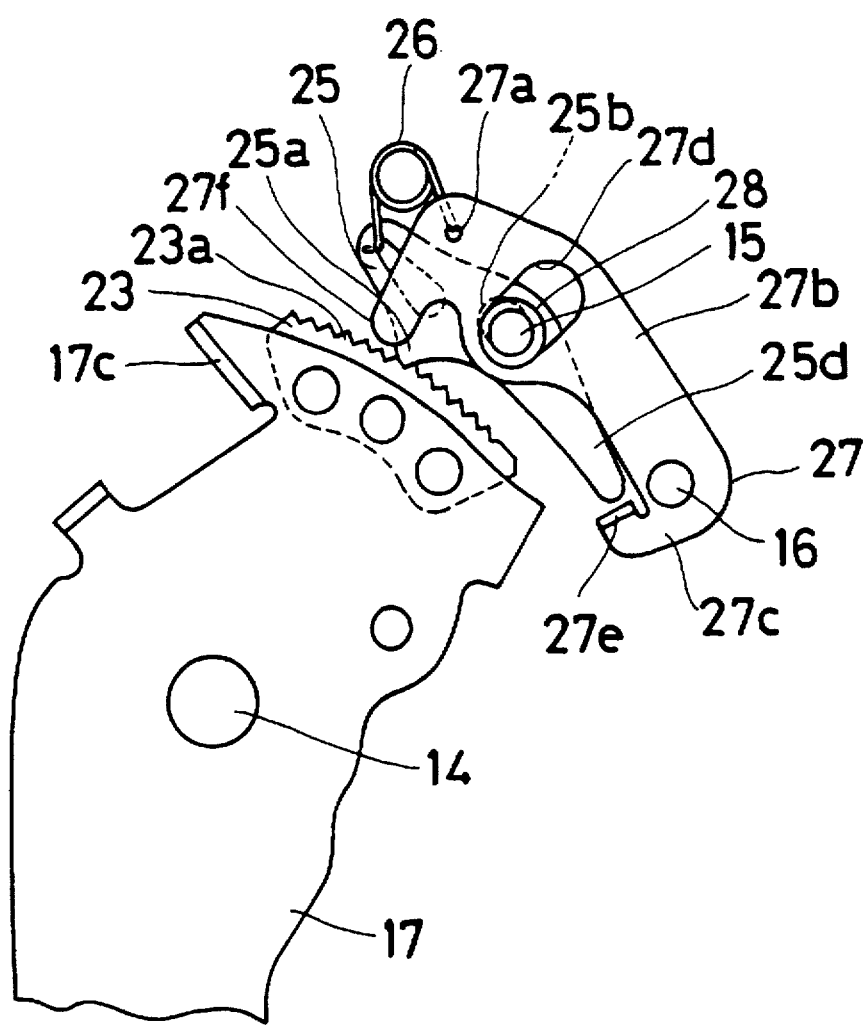
FIG. 6 is a side view of a portion of the parking brake with the parking brake pedal depressed.

A sector member 23 having a plurality of ratchet teeth 23a is connected to the upper part of the pedal 17 by a connection pin 24. A pawl 25 having a hook 25a that is engageable with the ratchet teeth 23a is rotatably supported around a connection pin 15 as shown in FIGS. 1 to 8. The ratchet teeth 23a and the pawl 25 are adapted to engage one another and hold the wheel brake mechanism at a position achieved when the pedal 17 is depressed. The ratchet teeth 23a are formed along a circular arc disposed about the pivotal center of the pedal 17. The pawl 25 is able to be turned between a first rotational position as illustrated in FIG. 6 where one of the hooks 25a of the pawl 25 is engaged with one of the ratchet teeth 23a and a second rotational position shown in FIG. 8 where the hooks 25a of the pawl 25 are released or disengaged from the ratchet teeth 23a. The rotational axis of the pawl 25 is generally parallel to the rotational axis of the pedal 17.

A hole 25b in the pawl 25 through which the connection pin 15 extends is elongated in the rotational direction of the pedal 17. This allows the pawl 25 to be slidably moved between a first slide position shown in FIGS. 5 and 6 and a second slide position illustrated in FIGS. 7 and 8.

A torsion spring 26 urges the pawl 25 to turn selectively towards either the first rotational position or the second rotational position and also constantly urges the pawl 25 to slide towards the first slide position. The torsion spring 26 has a first end 26a that is connected to a hole 25c in the pawl 25 and a second end 26b that is connected to a hole 27a in a release lever 27.

The release lever 27 is rotatably supported on a connection pin 16 and includes a long arm 27b and a short arm 27c. The long arm 27b is provided with an elongated hole 27d in which a collar 28 fitted on the connection pin 15 is slidably inserted. The release lever 27 is pivotable between a non-release position indicated in FIGS. 5 and 6, and a release position indicated in FIGS. 7 and 8.

As seen in FIGS. 3, 5, 6, 7 and 8, the pawl 25 is provided with an arm 25d. The short arm 27c of the release lever 27 is outfitted with an abutting portion 27e against which abuts the end of the arm 25d of the pawl 25. The release lever 27 is turned from the non-release position shown in FIGS. 5 and 6 to the release position illustrated in FIGS. 7 and 8 when the pawl 25 is slid from the first slide position depicted in FIGS. 5 and 6 to the second slide position shown in FIGS. 7 and 8.

The end of the long arm 27b of the release lever 27 is provided with an abutting portion 27f, and the parking brake pedal 17 is provided with an abutting portion 17c. The release lever 27 is turned from the release position shown in FIGS. 7 and 8 to the non-release position by the pedal 17 returning to the home position (i.e., the position shown in FIG. 1 where the parking brake is released)

The mass of the pawl 25 is distributed so that the gravitation produces on the pawl 25 a force which can turn the pawl 25 to the second rotational position. Thus, the engagement between the pawl 25 and the ratchet 23a can be removed even if the torsion spring 26 should break.

The operation of the parking brake control apparatus is as follows. FIGS. 1, 3 and 5 illustrate the state in which the parking brake mechanism is not actuated. When the parking brake pedal 17 is depressed to effect actuation of the parking brake mechanism, the pedal 17 turns about the bolt and nut 14 in a counterclockwise direction with reference to the illustrations in FIGS. 1, 3 and 5, thereby pulling the parking brake control cable 20 to operate the wheel brake mechanism. During the turning of the pedal 17, the hook 25a of the pawl 25, which is urged to turn towards the first rotational position by the torsion spring 26, engages one of the ratchet teeth 25a depending upon the degree of depression of the pedal 17. The state thus established is illustrated in FIG. 6.

Figure 7:
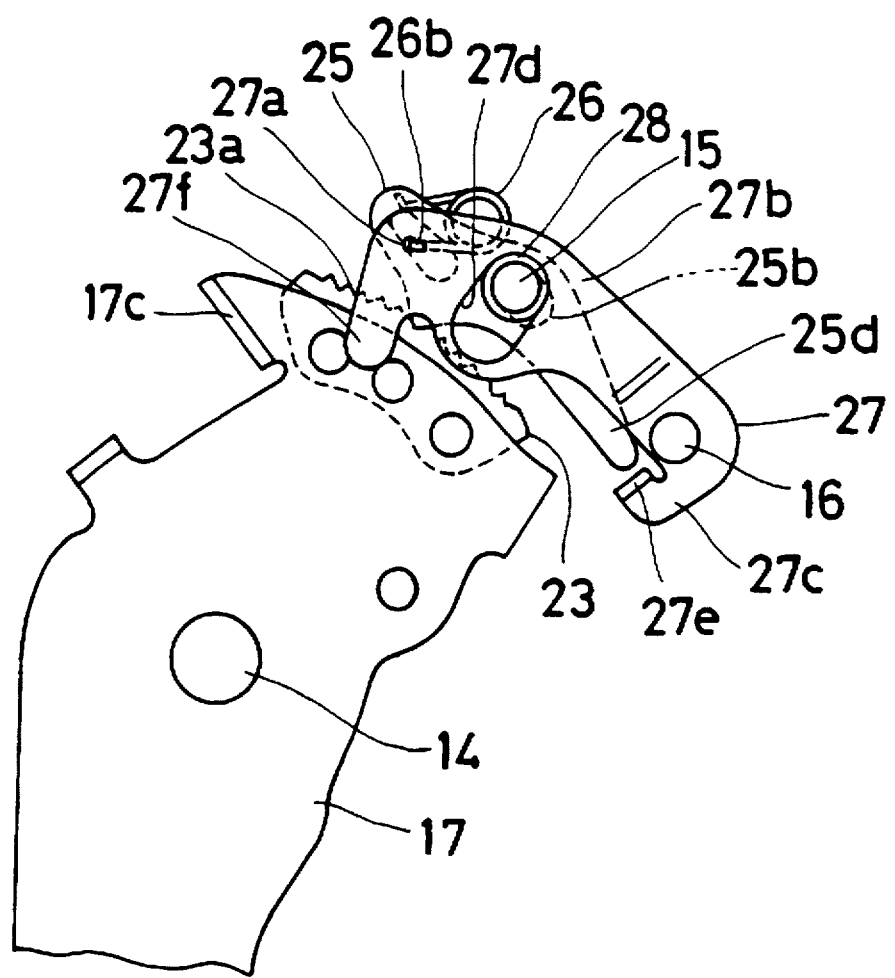
FIG. 7 is a side view of a portion of the parking brake with the depressing force on the parking brake pedal removed.

In the position shown in FIG. 6, the depressing force is still acting on the parking brake pedal 17. When the depressing force is then removed, the pawl 25 engaged with the ratchet teeth 23a is slid from the first slide position to the second slide position shown in FIG. 7 by the reaction force transmitted to the pedal 17 from the wheel brake mechanism by the parking brake control cable 20. The pedal 17 simultaneously turns clockwise to the location shown in FIG. 7. As the pawl 25 slides from the first slide position indicated in FIG. 6 to the second slide position indicated in FIG. 7, the end of the arm 25d of the pawl 25 abuts against and pushes the abutting portion 27e of the release lever 27, thus turning the release lever 27 from the non-release position depicted in FIG. 6 to the release position shown in FIG. 7. When the release lever 27 is turned to the release position, the posture or orientation of the torsion spring 26 is changed as shown in FIG. 7. Although the torsion spring 26 now urges the pawl 25 to turn towards the second rotational position, the pawl 25 is held in the first rotational position because the hook 25a is firmly engaged with the ratchet teeth 23a by the reaction force transmitted to the pedal 17 from the wheel brake mechanism. The parking brake is thus activated.

As described above, the direction in which the torsion spring 26 urges the pawl 25 is switched over when the pawl 25 slides from the first slide position to the second slide position. Although the displacement of the second end 26b of the second torsion spring 26 should preferably be large to ensure reliable switching of the urging direction, the amount of sliding of the pawl 25 should preferably also be minimized since the sliding movement of the pawl 25 reduces the effect of the parking brake. With the motion of the release lever 27 in accordance with the present invention, a minimum amount of sliding movement of the pawl 25 provides a significantly increased displacement of the second end 26b of the torsion spring 26.

Thus, the present invention minimizes the stroke loss occurring when the depression force on the pedal 17 is removed, and achieves reliable switching of the direction in which the torsion spring 26 urges the pawl 25. In addition, when the release lever 27 turns to the release position, the abutting portion 27f of the release lever 27 enters the traveling path of the abutting portion 17c of the pedal 17.

Figure 8:
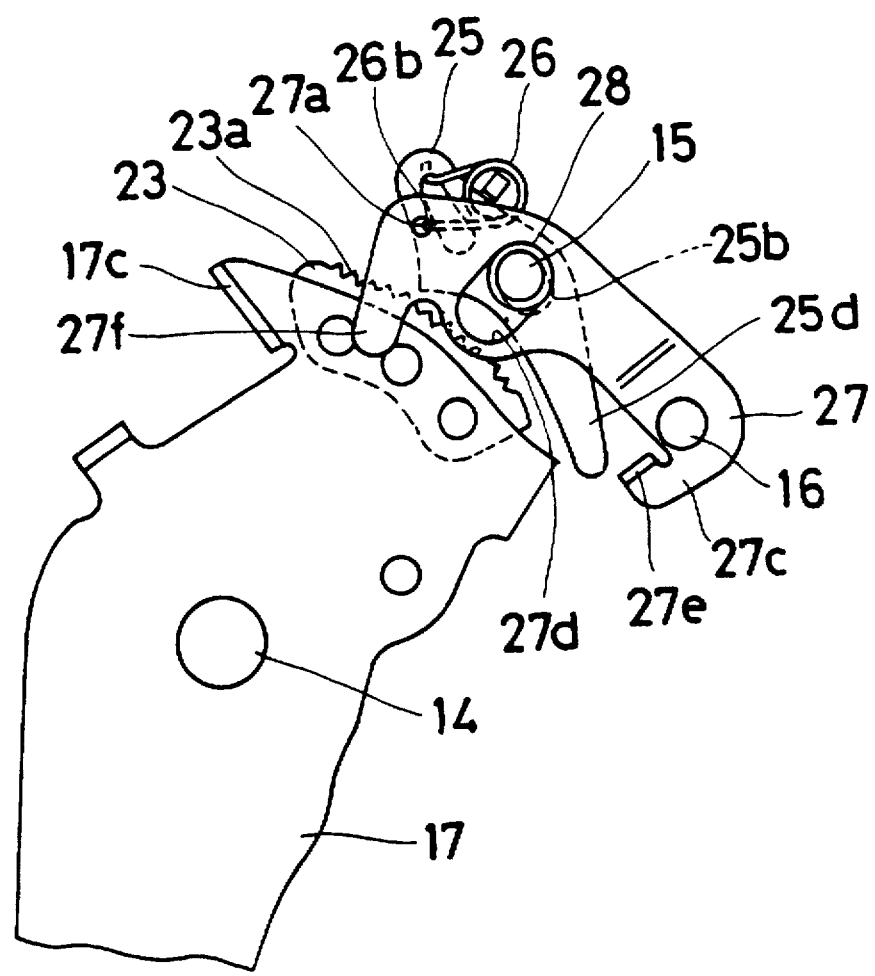
FIG. 8 is a side view of a portion of the parking brake with the parking brake pedal being depressed once again.

When the pedal 17 is depressed again to release the parking brake, the force that firmly engages the hook 25a of the pawl 25 with the ratchet teeth 23a is canceled so that the pawl 25 is turned to the second rotational position as indicated in FIG. 8, thus releasing the hook 25a from the ratchet 23a. Then, by removing the depressing force on the pedal 17, the pedal 17 is turned clockwise to the home position shown in FIGS. 1 and 3 by the reaction force from the wheel brake mechanism and the force from the returning spring 22. As the pedal 17 returns to the home position, the abutting portion 17c of the pedal 17 abuts and pushes the abutting portion 27f of the release lever 27 to turn the release lever 27 from the release position indicated in FIG. 8 to the non-release position depicted in FIG. 5. In turn, as the release lever 27 turns from the non-release position to the release position, the elastic restoration force of the torsion spring 26, which constantly urges the pawl 25 towards the first slide position shown in FIG. 5, is increased to slide the pawl 25 from the second slide position indicated in FIG. 8 to the first slide position.

Optionally, the force of the torsion spring 26 urging the pawl to slide towards the first slide position may be preset to an increased level such that the pawl 25 will be slid from the second slide position to the first slide position immediately when the hook 25a of the pawl 25 is released from the ratchet teeth 23a.

Even if the torsion spring 26 should break in the state as shown in FIG. 7, the parking brake will be released by depressing the pedal 17. This is because the gravitational force on the pawl 25 turns the pawl 25 in such a direction as to release the pawl 25 from the ratchet teeth 23a when the force that firmly engages the hook 25a of the pawl 25 with the ratchet teeth 23a is canceled or released through depression of the parking brake pedal 17.

As described above, the foot-operated parking brake control apparatus of the present invention is able to effect reliable operation of the parking brake. Also, a foot-operated parking brake control apparatus constructed in accordance with the present invention enables the size of the apparatus to be reduced while at the same time reducing the stroke loss. Further, with the suitable mass distribution of the pawl, the parking brake can be released without failure even if the spring urging the pawl should break.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A vehicular foot-operated parking brake control apparatus comprising:

a mounting bracket fixable to a vehicle body;

a pedal rotatably mounted on the bracket for rotation about a rotational axis, said pedal being connectable to a parking brake control cable;

a plurality of ratchet teeth provided on the pedal along an arc disposed about the rotational axis of the pedal;

a pawl rotatably mounted on the bracket for rotation about a rotational axis between a first rotational position in which the pawl is engaged with one of the ratchet teeth and a second rotational position in which the pawl is disengaged from the ratchet teeth, the rotational axis of the pawl being generally parallel to the rotational axis of the pedal, the pawl being slidably mounted on the bracket in the rotational direction of the pedal to slide between a first slide position and a second slide position;

a release lever rotatably mounted on the bracket for rotating about a rotational axis that is generally parallel to the rotational axis of the pedal to turn between a release rotational position and a non-release rotational position;

a spring having a first end connected to the pawl and a second end connected to the release lever, the spring imparting a spring force that constantly urges the pawl to slide towards the first slide position, the spring urging the release lever to stay in the non-release rotational position and urging the pawl to turn towards the first rotational position when the release lever is in the non-release position, and the spring urging the release lever to stay in the release rotational position and urging the pawl to turn towards the second rotational position when the release lever is in the release rotational position;

first cooperating means provided between the pawl and the release lever for turning the release lever from the non-release rotational position to the release rotational position when the pawl is moved from the first slide position to the second slide position; and second cooperating means provided between the release lever and the pedal for turning the release lever from the release rotational position to the non-release rotational position when the pedal is turned from a parking brake engaging position to a parking brake disengaging position.

2. A vehicular foot-operated parking brake control apparatus according to claim 1, wherein the mass of the pawl is distributed about the rotational axis of the pawl so that a gravitational force produced on the pawl is less than the force from the spring but large enough to turn the pawl from the first rotational position to the second rotational position if the spring force is removed.

3. A vehicular foot-operated parking brake control apparatus according to claim 1, wherein the mounting bracket includes a main bracket fixable to the vehicle body, an auxiliary bracket disposed generally parallel to the main bracket, a bolt and nut for connecting the auxiliary bracket to the main bracket, a first connection pin for connecting the auxiliary bracket to the main bracket, and a second connection pin for connecting the auxiliary bracket to the main bracket, the pedal being disposed between the main bracket and the auxiliary bracket and rotatably supported by the bolt and nut, the pawl being disposed between the main bracket and the auxiliary bracket and rotatably supported by the first connection pin, and the release lever being disposed between the auxiliary bracket and the pawl and rotatably supported by the second connection pin.

4. A vehicular foot-operated parking brake control apparatus according to claim 3, wherein the first cooperating means includes an arm provided on the pawl and an abutting portion provided on the release lever, and the second cooperating means includes an abutting portion provided on the pawl and an abutting portion provided on the pedal.

5. A vehicular foot-operated parking brake control apparatus according to claim 3, wherein the spring is a torsion spring.

6. A vehicular foot-operated parking brake control apparatus comprising:

a mounting bracket for being fixed to a vehicle body;

a pedal rotatably mounted on the bracket for rotation about a rotational axis to alternatively effect a parking brake engaged condition and a parking brake disengaged condition through application of a depression force to the pedal, said pedal being connectable to a parking brake control cable;

a plurality of ratchet teeth provided on the pedal along an arc disposed about the rotational axis of the pedal;

a pawl rotatably mounted on the bracket for being rotated in a first rotation direction in which the pawl is urged in a direction towards engagement with the ratchet teeth and a second rotational direction opposite the first rotational direction in which the pawl is urged in a direction away from engagement with the ratchet teeth, the pawl being rotatable about a rotational axis that is generally parallel to the rotational axis of the pedal, the pawl also being slidably mounted on the bracket to slide between a first slide position and a second slide position;

a spring connected to the pawl and movable between a first orientation, when the pedal is in the parking brake disengaged condition, in which the spring imparts a force to the pawl that urges the pawl towards the first slide position and that urges the pawl in the first rotational direction and a second orientation, when the pedal is in the parking brake engaged condition, in which the spring imparts a force to the pawl that urges the pawl towards the first slide position and that urges the pawl in the second rotational direction; and means for causing the spring to move from the first orientation to the second orientation upon release of the depression force applied to the pedal in the parking brake engaged condition.

7. A vehicular foot-operated parking brake control apparatus according to claim 6, wherein said means for causing the spring to move from the first orientation to the second orientation upon release of the depression force applied to the pedal in the parking brake engaged condition includes a rotatably mounted release lever.

8. A vehicular foot-operated parking brake control apparatus according to claim 7, wherein said spring has one end connected to the pawl and an opposite end connected to the release lever.

9. A vehicular foot-operated parking brake control apparatus according to claim 7, wherein said pawl is rotatably mounted on a first pin and said release lever is rotatably supported on a second pin spaced from the first pin.

10. A vehicular foot-operated parking brake control apparatus according to claim 9, wherein said pawl includes an elongated hole through which the first pin extends.

11. A vehicular foot-operated parking brake control apparatus according to claim 9, wherein said release lever includes an elongated hole through which the first pin extends.

12. A vehicular foot-operated parking brake control apparatus according to claim 7, wherein said release lever includes a short arm connected to a long arm, the short arm being provided with an abutting portion that is engaged by an arm of the pawl upon release of the depression force applied to the pedal in the parking brake engaged condition.

13. A vehicular foot-operated parking brake control apparatus according to claim 6, wherein the mounting bracket includes a main bracket, an auxiliary bracket disposed generally parallel to the main bracket, and a bolt and nut for connecting the auxiliary bracket to the main bracket.

14. A vehicular foot-operated parking brake control apparatus according to claim 13, including a first connection pin for connecting the auxiliary bracket to the main bracket and a second connection pin for connecting the auxiliary bracket to the main bracket, the pedal being disposed between the main bracket and the auxiliary bracket and being rotatably supported by the bolt.

15. A vehicular foot-operated parking brake control apparatus according to claim 14, wherein the pawl is disposed between the main bracket and the auxiliary bracket and is rotatably supported by the first connection pin.

* * * * *